United States Patent

[11] 3,610,976

| [72] | Inventor | Lawrance W. Wightman<br>St. Louis, Mo. |
|---|---|---|
| [21] | Appl. No. | 52,230 |
| [22] | Filed | July 6, 1970 |
| [45] | Patented | Oct. 5, 1971 |
| [73] | Assignee | Emerson Electric Co.<br>St. Louis, Mo.<br>Continuation-in-part of application Ser. No.<br>787,664, Dec. 30, 1968. |

[54] COOLING MEANS FOR ELECTRIC MOTORS
3 Claims, 3 Drawing Figs.

[52] U.S. Cl. ........................................... 310/60,
310/64
[51] Int. Cl. ............................................. H02k 9/06
[50] Field of Search............................................ 310/62, 63,
64, 60

[56] References Cited
UNITED STATES PATENTS
1,819,182   8/1931   Lincoln .......................... 310/63

2,074,067   3/1937   Darnell.......................... 310/62
FOREIGN PATENTS
610,507   3/1935   Germany....................... 310/63

Primary Examiner—D. X. Sliney
Attorney—Charles E. Markham

ABSTRACT: A drip-proof electric motor construction in which the motor casing comprises a cylindrical stator shell and rotor supporting end walls with air vents spaced entirely around the shell near both ends and in the end walls, in which large diameter blowers in both ends of the casing cause air to flow at high velocity axially into the casing through the end wall vents, over the end faces of the rotor and stator and outward through the shell vents, and in which a continuous circular band at each end of the shell has an axial wall portion overlying and shielding the shell vents from drip and a continuous radial wall portion spacing the axial wall portion outward from said shell and deflecting the airflow inward over the outer surface of the shell.

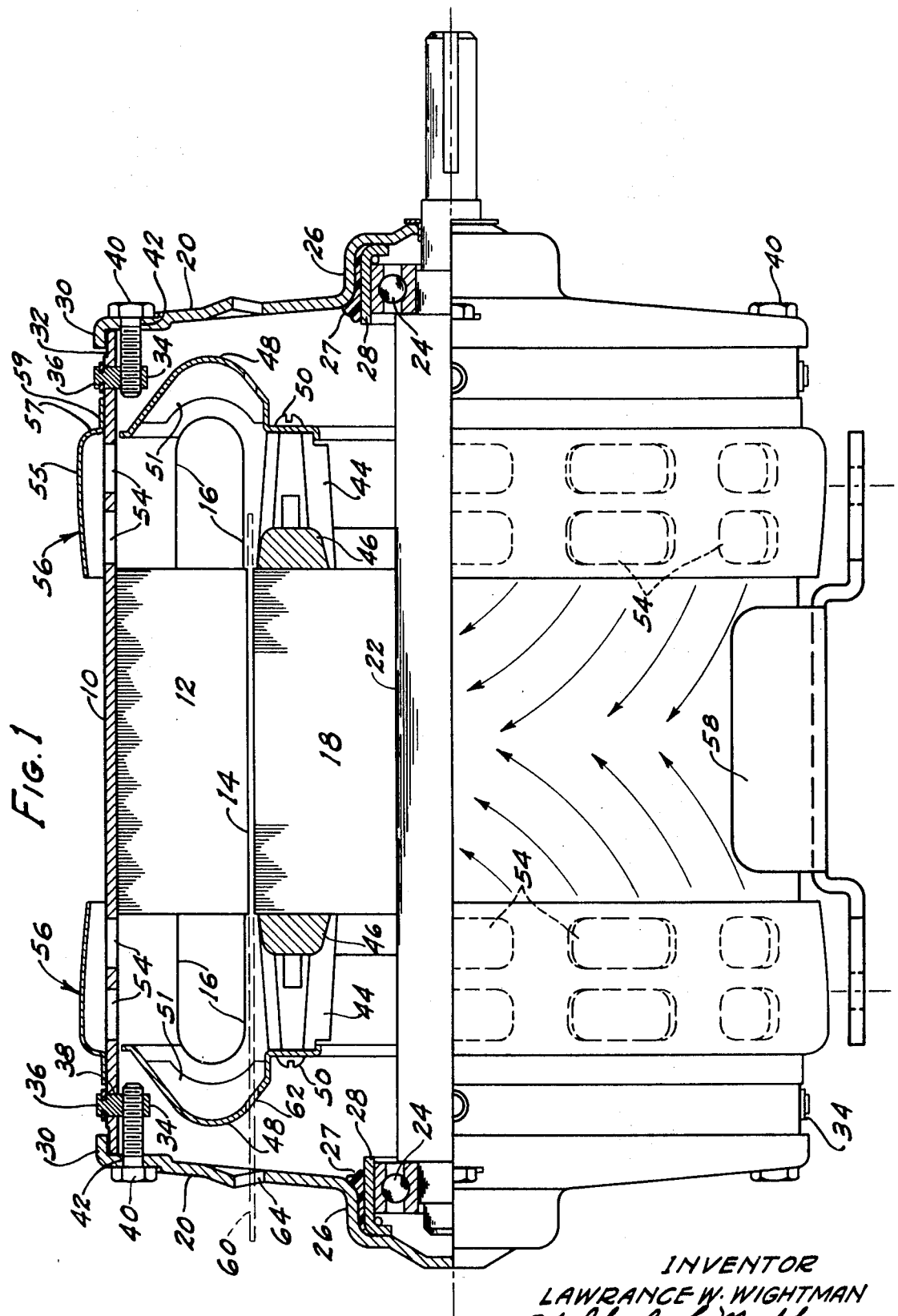

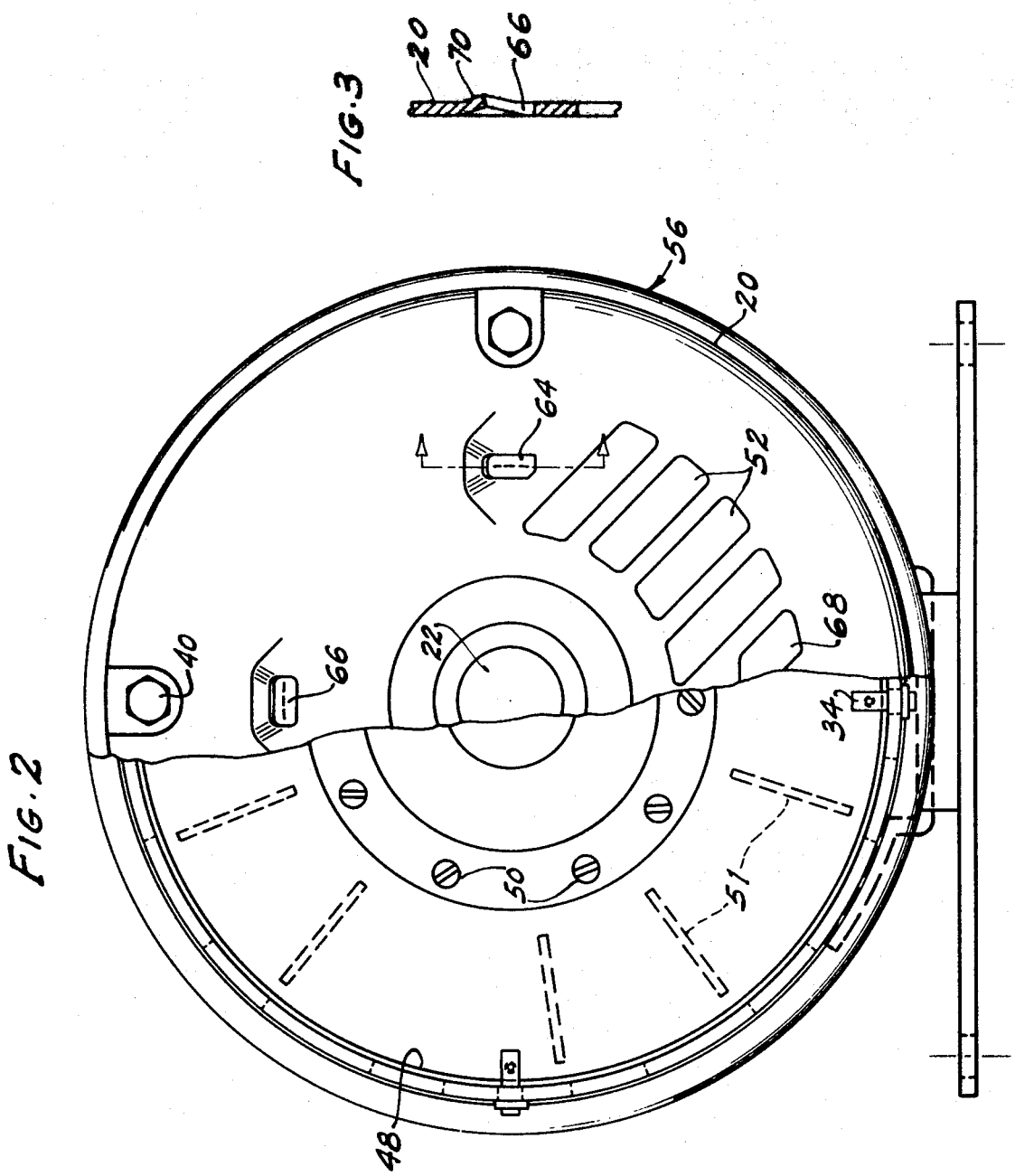

COOLING MEANS FOR ELECTRIC MOTORS

This application is a continuation-in-part of my copending application, Ser. No. 787,664, filed Dec. 30, 1968.

This invention relates to dynamoelectric machines, and particularly to a low-cost, drip-proof electric motor construction in which greatly improved air cooling permits a substantial increase in horsepower output per pound of active material.

An object of the invention is to provide a low-cost, drip-proof electric motor construction in which maximum cooling of the motor by passage of cooling air over the heating parts is achieved.

A further object is to provide an electric motor adapted to horizontal shaft operation in which the axial wall of the motor casing is provided with air vents spaced entirely around the wall near both ends and in which the vents are shielded from drip.

A further object of the invention is to provide an electric motor having a casing comprising a stator shell embracing the entire periphery of the stator in uninterrupted conductive heat transfer relationship therewith, and rotor supporting end walls, and having blower and venting means causing air to flow at high velocity into the ends of the casing through vents in the end walls and to flow outward through vents in the end portions of the stator shell and axially inward across the outer surface of the stator shell.

Further objects and advantages will appear when reading the following description of a form of the present invention in connection with the accompanying drawings. In the drawings:

FIG. 1 is a half-sectionalized, side elevational view of an AC electric motor constructed in accordance with the present invention;

FIG. 2 is a half-sectionalized, end elevational view of the motor shown in FIG. 1; and FIG. 3 is a fragmentary sectional view showing an access aperture in the end shield and is taken along line 3—3 of FIG. 2.

Referring to the drawings in more detail, the illustrated form of the present invention includes a cylindrical stator shell 10 into which a laminated stator core 12, having an uninterrupted circular periphery, is tightly fitted and fixed by suitable means, whereby the entire periphery of the stator core 12 is in heat conductive relationship with the shall 10. The stator core has a bore 14 and winding end turns, the outlines of which are indicated at 16. The motor further includes a rotor 18 rotatably mounted in the stator bore 14. The cylindrical stator shell 10 is preferably a steel tube with smooth inner and outer surfaces, and it extends axially outward at both ends beyond the ends of the rotor and stator and winding end turns and has fixed to each end thereof an end shield 20. The rotor includes a shaft 22 having ball bearings 24 fixed on end portions thereof, which ball bearings are supported in internal recesses 26 formed in the end shields 20.

The ball bearings 24 are entered in slip fit relationship into bearing locating rings 28, and the bearing locating rings are loosely received in the recesses 26 and are cemented therein with an adhesive structural cement 27, which is applied in soft paste form and subsequently hardened to rigidly fix the bearing locating rings 28 in the end shield recesses. The end shields 20 have short axially extending peripheral rims 30 which nicely fit over machined surfaces 32 at the ends of shell 10. The end shields are detachably fixed at their peripheries to the ends of shell 10 by removable nuts 34, which have rectangular shank portions 36 entered radially into the shell 10 through peripherally spaced rectangular holes 38 in the wall of the shell, and by bolts 40 passing through clearance holes 42 in the end shields and threadedly engaging the nuts 34.

The rotor is provided with circularly arranged, radial blower vanes 44 at each end thereof, cast integral with rotor end rings 46. The vanes 44 extend axially outward from the rotor end rings 46 and support at their free ends the annuluses 48. The annuluses 48 are attached at their inner edges to the ends of vanes 44 by screws 50 and are of such outside diameter that their peripheries have a running fit in the shell 10. The vanes 44 coextend radially with outer portions of the end faces of the rotor 18, and the annuluses 48 coextend radially with the entire end faces of the stator.

The annuluses 48 are of generally concavo-convex, cross-sectional configuration with concave sides facing the ends of the stator, and they are provided with circularly arranged vanes 51 extending radially across the concave sides therefor and coextending radially with the end faces of the stator core.

The end shields 20 are provided with air vents 52 in the lower halves thereof, and the cylindrical shell 10 is provided with air vents 54 spaced entirely around the wall thereof near each end and extending between the peripheral edge of the annuluses 48 and the ends of the stator core. Overlying these circularly spaced air vents 54 near each end of the shell is a circular band 56, which bands serve as drip-proof covers for the vents 54 and as deflectors to direct air issuing therefrom axially inward over the exterior surface of the shell 10. The bands 56 each comprise an axially extending wall portion 55 and a radial wall portion 57, and may further include axial lip 59 lying against the shell to facilitate fastening the band to the shell. Conveniently, the bands 56 may be cemented to the shell with an epoxy resin.

Air emerging from shell vents 56 has rotational as well as radial velocity, and it has been found that a continuous band deflector and drip guard, as shown at 56, permits the emerging air to flow inward over the shell surface in a spiral pattern, as indicated by directional arrows in FIG. 1. Smoke tests have indicated that the emerging cooling air remains in contact with the shell surface for a considerably greater distance when permitted to flow spirally than when directed to flow axially straight across the shell by axial sidewalls of individual louvre elements. Temperature tests have shown that this increases cooling of the shell.

In assembling the motor, the stator assembly is press fitted into the shell 10, whereby the entire periphery of the stator core is in heat conductive relationship with the wall of shell 10. Thereafter, the rotor, with the ball bearings fixed on the rotor shaft and the bearing locating rings slip fitted on the bearings is entered into the stator bore and temporarily fixed concentrically and axially therein by means of removable shims 60 entered between the rotor and stator bore. The cement 27, in paste form, is now applied to the outer surfaced of locating rings 28, and the end shields 20 are then moved axially into assembled position with rim portions 30 fitted on machined surfaces 32. Removable nuts 36 are now entered into the shell and bolts 40 are entered and tightened. Heat is then applied to harden the cement 27, thereby rigidly fixing the loosely fitting locating rings 40 in axial alignment in end shield recesses 42.

The shims 60, which extend exteriorly of the casing through access apertures 62 in the left blower annulus 48 and through access apertures 64, 66, and 68 in the left-end shield 20, are now withdrawn. The access apertures 64 and 66 in left-end shield 20 are formed by extruding and piercing, as shown in FIGS. 1 and 3, thereby to provide an upper overhanging ledge 70 to deflect vertical drip.

In operation, ambient air is drawn into the ends of the casing through vents 52 in the end shields an moved radially outward at high velocity by radial vanes 44 and 50. The radially outward moving air, after passing over the end faces of the rotor, is for the most part deflected axially outward by the stator winding end turns 16, whereupon it is again deflected axially inward around and over the winding end turns toward the end faces of the stator core by the concave surfaces of annuluses 48 and then exits from the casing through the vents 54 in the wall of shell 10. The air also moves, of course, in a circular path as it moves radially outward.

The air emerging from vents 54 is now directed axially inward by the bands 56 and flows in a spiral pattern over the exterior surface of that part of the shell 10 which is in heat conductive relationship with the periphery of stator core 12. It has been found by smoke tests than when the emerging air is permitted to flow spirally across the shell surface, collision of the flow from opposite ends of the shell is delayed considerably over that which occurs when the emerging air is directed axially straight across the shell. Collision of these opposed air flows causes the air to lift from the surface of the shell, after which it becomes ineffective to coil the shell. The vents 54 are provided in pairs, as shown, rather than as single larger vents, merely to reduce weakening of the shell wall.

I claim:

1. In a drip-proof electric motor, a casing comprising a horizontal, cylindrical, stator shell with end walls, a stator fitted into said shell, a rotor mounted for rotation in said stator and including a shaft journaled in said end walls, said cylindrical shell being longer than said stator, there being a space between each end of said stator and the adjacent end wall, a plurality of air vents in opposite end portions of said shell arranged in spaced relationship entirely around said shell and positioned axially between the ends of said stator and said end walls, a plurality of drip-proof air vents in each of said end walls a rotor-driven centrifugal blower in each end of said casing, each comprising an annulus having radially extending vanes on the stator side thereof and operative to draw air into said casing through said end wall vents, and to cause it to flow radially outward across the end faces of said rotor and stator, and thence outward from said casing through said shell vents, and cover means for said shell vents comprising a circular band near each end of said shell overlying said shell vents, said bands each including an axially extending circular wall portion overlying said shell vents and a continuous wall portion extending radially inward from the outboard edge thereof supporting the axially extending wall portion in outward spaced relationship with the exterior shell surface, whereby said bands shield said vents from drip, and said radially inward extending supporting portions thereof operate to deflect air emerging from said shell vents axially inward, thereby to cause it to flow spirally across the exterior surface of said stator shell.

2. In a drip-proof electric motor, a stator casing comprising a cylindrical steel stator shell an detachable end walls, a stator core having an uninterrupted circular periphery press fitted into said shell, a rotor mounted for rotation in said stator including a shaft journaled in said end walls, said shell being longer than said core and there being spaces at each end of said stator core, a rotor-driven blower in each of said spaces comprising an air directing annulus having a peripheral edge in axial spaced relationship with the adjacent end of said stator core, said annuluses being of such diameter as to have a running fit in said stator shell, a plurality of air vents arranged in spaced relationship entirely around said stator shell near each end thereof, said vent being axially positioned between the ends of said stator core and the peripheral edges of said annuluses, a plurality of drip-proof air vents in each of said end walls, said annuluses including radial vanes on the inboard sides thereof and being operative to draw cooling into said casing through said end wall vents and to cause it to flow radially outward over the end faces of said rotor and stator and to exhaust it through said shell vents, and drip-proof deflector means comprising a curved wall portion overlying said shell vents and a portion extending radially inward from the outboard edge of said curved potion supporting said curved portion in outward spaced relationship with said stator shell, and said radially inward extending portions being operative to deflect air axially inward over the exterior surface of said stator shell.

3. An electric motor as set forth in claim 1 in which said blower annuluses coextend radially with the end faces of said stator core, are of concavo-convex form in cross section, are arranged with their concave sides facing the ends of said stator core, and have circularly arranged air moving vanes extending radially across portions of their concave sides.